(12) United States Patent
Meng et al.

(10) Patent No.: US 11,402,873 B2
(45) Date of Patent: Aug. 2, 2022

(54) RELEASE MECHANISMS FOR COUPLED DEVICES

(71) Applicant: Apple Inc., Cupertino, CA (US)

(72) Inventors: Jingshi Meng, Santa Clara, CA (US);
Sung Chang Lee, Saratoga, CA (US);
David N. Zieba, Santa Clara, CA (US);
Kee Suk Ryu, Cupertino, CA (US);
Noel G. Aguilar, Campbell, CA (US);
Orpheus J. Allen, San Jose, CA (US);
Yachi Chen, San Jose, CA (US);
Yufeng Hou, Newark, CA (US); Wei Guang Wu, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 444 days.

(21) Appl. No.: 16/358,542

(22) Filed: Mar. 19, 2019

(65) Prior Publication Data
US 2020/0201396 A1   Jun. 25, 2020

Related U.S. Application Data

(60) Provisional application No. 62/782,259, filed on Dec. 19, 2018.

(51) Int. Cl.
*G06F 1/16* (2006.01)
*G06F 3/01* (2006.01)
*G06F 3/0354* (2013.01)

(52) U.S. Cl.
CPC ............ *G06F 1/1656* (2013.01); *G06F 3/017* (2013.01); *G06F 3/03545* (2013.01)

(58) Field of Classification Search
CPC .... G06F 1/1656; G06F 3/017; G06F 3/03545; G06F 3/0346; G06F 1/1607; G06F 2200/1632; G06F 1/1626
See application file for complete search history.

(56) References Cited

U.S. PATENT DOCUMENTS

| | | | |
|---|---|---|---|
| 6,366,440 B1 * | 4/2002 | Kung .................... | E05C 19/16 |
| | | | 361/147 |
| 9,101,052 B2 * | 8/2015 | Chou ................... | H04M 1/0235 |
| 9,494,980 B2 | 11/2016 | Corbin et al. | |
| 9,507,381 B1 * | 11/2016 | Vanderet ............. | G06F 3/03545 |
| 9,612,622 B2 * | 4/2017 | Moon ....................... | H02H 7/20 |
| 9,696,752 B2 * | 7/2017 | Stryker ................ | G06F 1/1654 |
| 9,997,286 B2 * | 6/2018 | Herman ................ | H01F 7/0252 |
| 10,050,378 B2 * | 8/2018 | Szeto ................... | H04B 5/0031 |
| 10,104,217 B2 * | 10/2018 | Kim ........................ | G06F 1/266 |
| 10,153,077 B2 * | 12/2018 | Barel .................. | G06F 3/04883 |
| 10,401,982 B2 * | 9/2019 | Seo ..................... | G06F 3/04162 |
| 10,466,815 B2 * | 11/2019 | Shida ..................... | G06F 3/0383 |
| 10,802,612 B2 * | 10/2020 | de la Fuente ....... | G06F 3/03545 |

(Continued)

*Primary Examiner* — Grant Sitta
(74) *Attorney, Agent, or Firm* — Bakerhostetler

(57) ABSTRACT

A stylus and/or a host device can be provided with components to mitigate and/or avoid damage to the stylus and/or the host device when dropped. Such components can cause the stylus and the electronic device to separate when drop motion is detected. Such separation can reduce and/or prevent damage that would have otherwise occurred if the stylus and the electronic device remained coupled together during impact. Examples of coupling and detachment mechanisms include magnetic and mechanical components.

18 Claims, 9 Drawing Sheets

(56) References Cited

U.S. PATENT DOCUMENTS

| | | | |
|---|---|---|---|
| 2002/0190823 A1* | 12/2002 | Yap | G06F 3/03545 335/205 |
| 2007/0138806 A1* | 6/2007 | Ligtenberg | H05K 5/0221 292/251.5 |
| 2008/0297328 A1* | 12/2008 | Crawford | A63F 13/285 340/407.2 |
| 2010/0238620 A1* | 9/2010 | Fish | G06F 1/1681 361/679.09 |
| 2010/0277304 A1* | 11/2010 | Haartsen | G06F 1/3215 340/531 |
| 2012/0069503 A1* | 3/2012 | Lauder | G06T 1/00 361/679.01 |
| 2012/0295451 A1* | 11/2012 | Hyun-Jun | H01R 13/6205 439/39 |
| 2013/0106723 A1 | 5/2013 | Bakken et al. | |
| 2013/0135067 A1* | 5/2013 | Choi | H01F 7/206 335/290 |
| 2013/0226754 A1* | 8/2013 | Boldyrev | H04M 1/18 705/35 |
| 2013/0257582 A1* | 10/2013 | Rothkopf | G06F 1/1656 340/3.1 |
| 2014/0029182 A1* | 1/2014 | Ashcraft | G06F 3/03545 361/679.4 |
| 2014/0034080 A1* | 2/2014 | Paquet | B65D 43/26 132/286 |
| 2014/0049894 A1* | 2/2014 | Rihn | G06F 1/1616 361/679.27 |
| 2014/0065846 A1* | 3/2014 | Poh | H01R 11/30 439/39 |
| 2014/0211445 A1* | 7/2014 | Hirai | G06F 1/1654 361/809 |
| 2014/0253284 A1* | 9/2014 | Peterson | H04B 1/3888 340/3.1 |
| 2015/0116286 A1* | 4/2015 | Stewart | G06F 1/1656 345/179 |
| 2015/0146371 A1* | 5/2015 | Liang | G06F 1/1656 361/679.56 |
| 2015/0153783 A1* | 6/2015 | Corbin | G06F 1/1643 361/679.09 |
| 2017/0068339 A1 | 3/2017 | Zimmerman et al. | |
| 2017/0108952 A1* | 4/2017 | Tang | G06F 3/03545 |
| 2017/0220077 A1* | 8/2017 | Holung | G06F 1/1681 |
| 2017/0267898 A1* | 9/2017 | Singla | G06F 3/03545 |
| 2018/0053588 A1* | 2/2018 | Barel | G06F 3/03545 |
| 2018/0054502 A1* | 2/2018 | Wilson | G06F 1/1633 |
| 2018/0059817 A1* | 3/2018 | Pirie | G06F 1/1626 |
| 2018/0335800 A1* | 11/2018 | Kim | H05K 5/0217 |
| 2019/0215975 A1* | 7/2019 | Alva | G06F 1/1656 |
| 2021/0200339 A1* | 7/2021 | Kanas | G06F 3/03545 |

\* cited by examiner

RELEASE MECHANISMS FOR COUPLED DEVICES

CROSS-REFERENCE TO RELATED APPLICATIONS

This application claims the benefit of U.S. Provisional Application No. 62/782,259, entitled "RELEASE MECHANISMS FOR COUPLED DEVICES," filed Dec. 19, 2018, the entirety of which is incorporated herein by reference.

TECHNICAL FIELD

The present description relates generally to electronic devices, and, more particularly, to a stylus that can be coupled to a host device.

BACKGROUND

A variety of handheld input devices exist for detecting input from a user during use. For example, a stylus can be utilized to provide input by contacting a touch panel of an electronic device. The touch panel may include a touch sensitive surface that, in response to detecting a touch event, generates a signal that can be processed and utilized by other components of the electronic device. A display component of the electronic device may display textual and/or graphical display elements representing selectable virtual buttons or icons, and the touch sensitive surface may allow a user to navigate the content displayed on the display screen. Typically, a user can move one or more input devices, such as a stylus, across the touch panel in a pattern that the device translates into an input command.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Some electronic devices that include a display surface and/or a touch panel receive tactile input from a user. For example, a stylus can be utilized to provide input by contacting a touch panel of an electronic device. The touch panel may include a touch sensitive surface that, in response to detecting a touch event, generates a signal that can be processed and utilized by other components of the electronic device. A display component of the electronic device may display textual and/or graphical display elements representing selectable virtual buttons or icons, and the touch sensitive surface may allow a user to navigate the content displayed on the display screen. Typically, a user can move one or more input devices, such as a stylus, across the touch panel in a pattern that the device translates into an input command.

Such electronic devices can be susceptible to damage when dropped or placed under stress. Damage to electronic devices may be increased when forces are concentrated at particular regions. For example, while a stylus is coupled to an exterior surface of an electronic device, forces applied to the stylus can be transmitted to a focused region of the electronic device, causing damage to the electronic device in addition to damage to the stylus.

In accordance with embodiments disclosed herein, components of a stylus and/or an electronic device can be provided to mitigate and/or avoid damage to the stylus and/or the electronic device. Such components can cause the stylus and the electronic device to separate when drop motion is detected. Such separation can reduce and/or prevent damage that would have otherwise occurred if the stylus and the electronic device remained coupled together during impact.

These and other embodiments are discussed below with reference to FIGS. 1-15. However, those skilled in the art will readily appreciate that the detailed description given herein with respect to these Figures is for explanatory purposes only and should not be construed as limiting.

Figure 1:
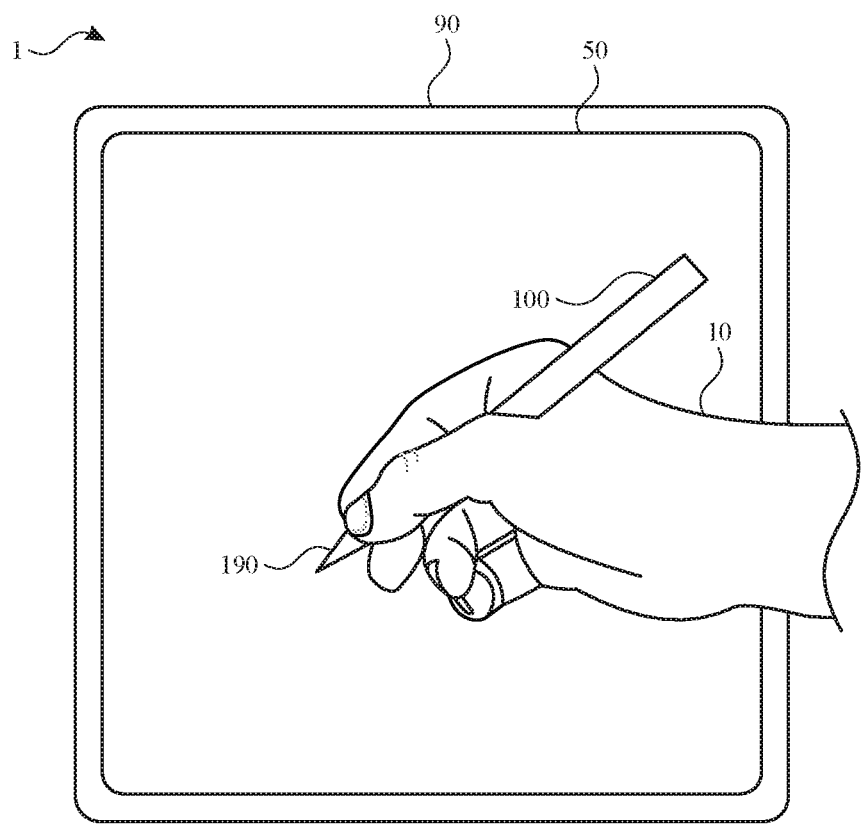
FIG. 1 illustrates a view of a system including a stylus and a host device, according to some embodiments of the subject technology.

A touch-based input device in accordance with embodiments disclosed herein can include any device that is held, worn, or contacted by a user for providing input and/or receiving feedback. The touch-based input device can be used alone or in conjunction with another device. For example, FIG. 1 illustrates a system 1 including a stylus 100 and a host device 90 having a surface 50, according to some embodiments of the subject technology. The stylus 100 can be held by a user 10 and operate as a touch-based input device for use with the host device 90.

The surface 50 of the host device 90 can include a display surface and/or a touch panel for interacting with the stylus 100 when contacted thereby. The host device 90 utilizes the display to render images to convey information to the user. The display can be configured to show text, colors, line drawings, photographs, animations, video, and the like. The surface 50 of the host device 90 can be implemented with any suitable technology, including, but not limited to, a multi-touch and/or multi-force sensing touchscreen that uses liquid crystal display technology, light-emitting diode technology, organic light-emitting display technology, organic electroluminescence technology, electronic ink, or another type of display technology or combination of display technology types.

The stylus 100 can include a tip 190 for contacting the surface 50. Such contact can be detected by the host device 90 and/or the stylus 100. For example, the stylus 100 can include one or more sensors that detect when the tip 190 contacts and applied pressure to the surface 50. Such sensors can include one or more contact sensors, capacitive sensors, touch sensors, cameras, piezoelectric sensors, pressure sensors, proximity sensors, electric field sensors, photodiodes, and/or other sensors operable to detect contact with the surface 50. Such sensors can optionally operate cooperatively with the host device 90 to detect contact with the surface 50. In use, a user may manipulate the stylus 100 and apply a force to a surface 50 of the host device 90. A corresponding reaction force may be transferred through the tip 190 of the stylus 100 connected to an electromechanical coupling and to the sensor of the stylus 100. The sensor, or a portion thereof, may deform in response which may be measured and used to estimate the applied force. The sensor can be used to produce a non-binary output that corresponds to the applied force. For example, the sensor can be used to produce an output that represents a magnitude that varies in accordance with a variable amount of applied force.

The stylus can include one or more other sensors and/or input module for facilitating interaction by a user. For example, the stylus 100 can include a touch sensor that can be provided to detect contact by a user on a grip region of the housing of the stylus 100. The touch sensor can include a capacitive touch sensor. The touch sensor can include multiple sensing elements, such as conductive electrodes, to detect contact and changes in contact at multiple locations.

Figure 2:
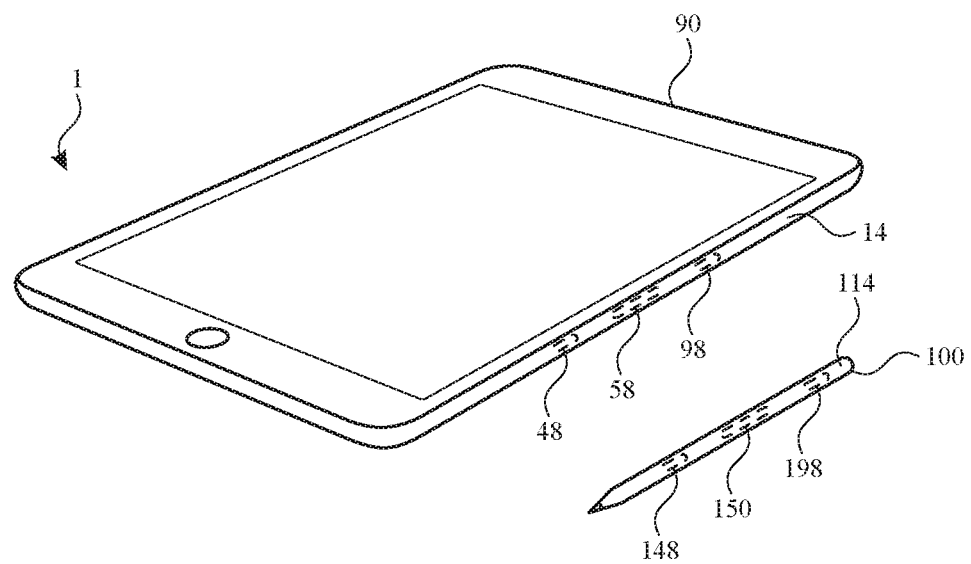
FIG. 2 illustrates a perspective view of a stylus and host device, according to some embodiments of the subject technology.
Figure 3:
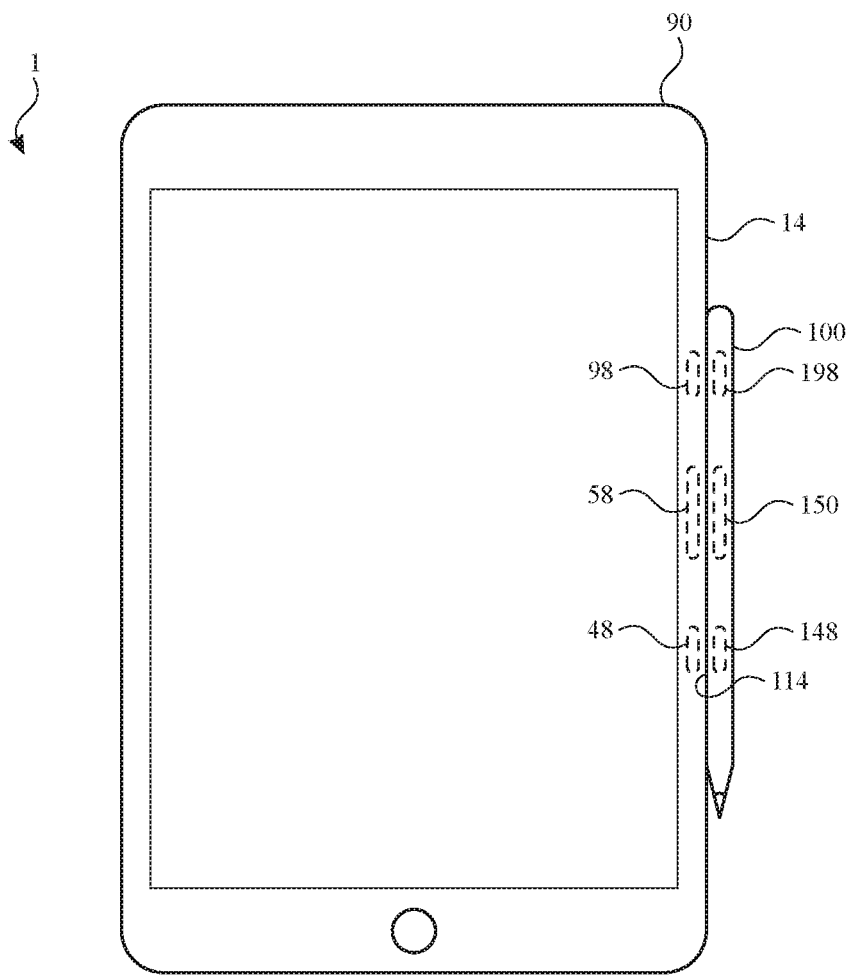
FIG. 3 illustrates a front view of a stylus and host device, according to some embodiments of the subject technology.

Referring now to FIGS. 2 and 3, use of the stylus with a host device can provide wireless charging for the stylus. As shown in FIG. 2, a stylus power module 150 within the housing of the stylus 100 and multiple stylus magnets 148 and 198 positioned on opposite sides of the stylus power module 150. The stylus power module 150 and the multiple stylus magnets 148 and 198 can be positioned on a same radial side of the stylus 100 and adjacent to an engagement portion 114 of the housing. For example, the engagement portion 114 can be flat or otherwise provide a shape that is complementary to a shape of an engagement portion 14 of the host device 90. It will be understood that additional stylus magnets can optionally be included, and that the stylus magnets can be provided in other arrangements, such as on a same longitudinal side of the stylus power module 150.

The stylus magnets 148 and 198 provide magnetic coupling to corresponding host magnets 48 and 98 of the host device 90. As further shown in FIG. 2, a host power module 58 is provided by the host device 90. The host magnets 48 and 98 can be positioned on opposite sides of the host power module 58. The stylus power module 150 and the multiple stylus magnets 148 and 198 can be positioned adjacent to an engagement portion 14 of the host device 90. The host power module 58 and the host magnets 48 and 98 can be positioned so that, when the stylus magnets 148 and 198 are aligned with the host magnets 48 and 98, the stylus power module 150 is aligned with the stylus power module 150 of the host device 90. It will be understood that additional host magnets can optionally be included, and that the host magnets can be provided in other arrangements, such as on a same longitudinal side of the host power module 58.

As shown in FIG. 3, the magnetic coupling can maintain the alignment during a charging session. The engagement portion 114 of the stylus 100 can facilitate secure coupling to the host device 90. For example, the host device 90 can provide another flat surface or other complementary shape to facilitate physical contact of the opposing surfaces and maintain close proximity to the host power module 58 and the stylus power module 150. It will be understood that other surface shapes and features are contemplated to facilitate contact and engagement of the stylus to the host device. For example, the surfaces of the engagement portion 114 and the engagement portion 14 can be flat, curved, concave, convex, undulating, stepped, tapered, or another shape to provide engagement.

Figure 4:
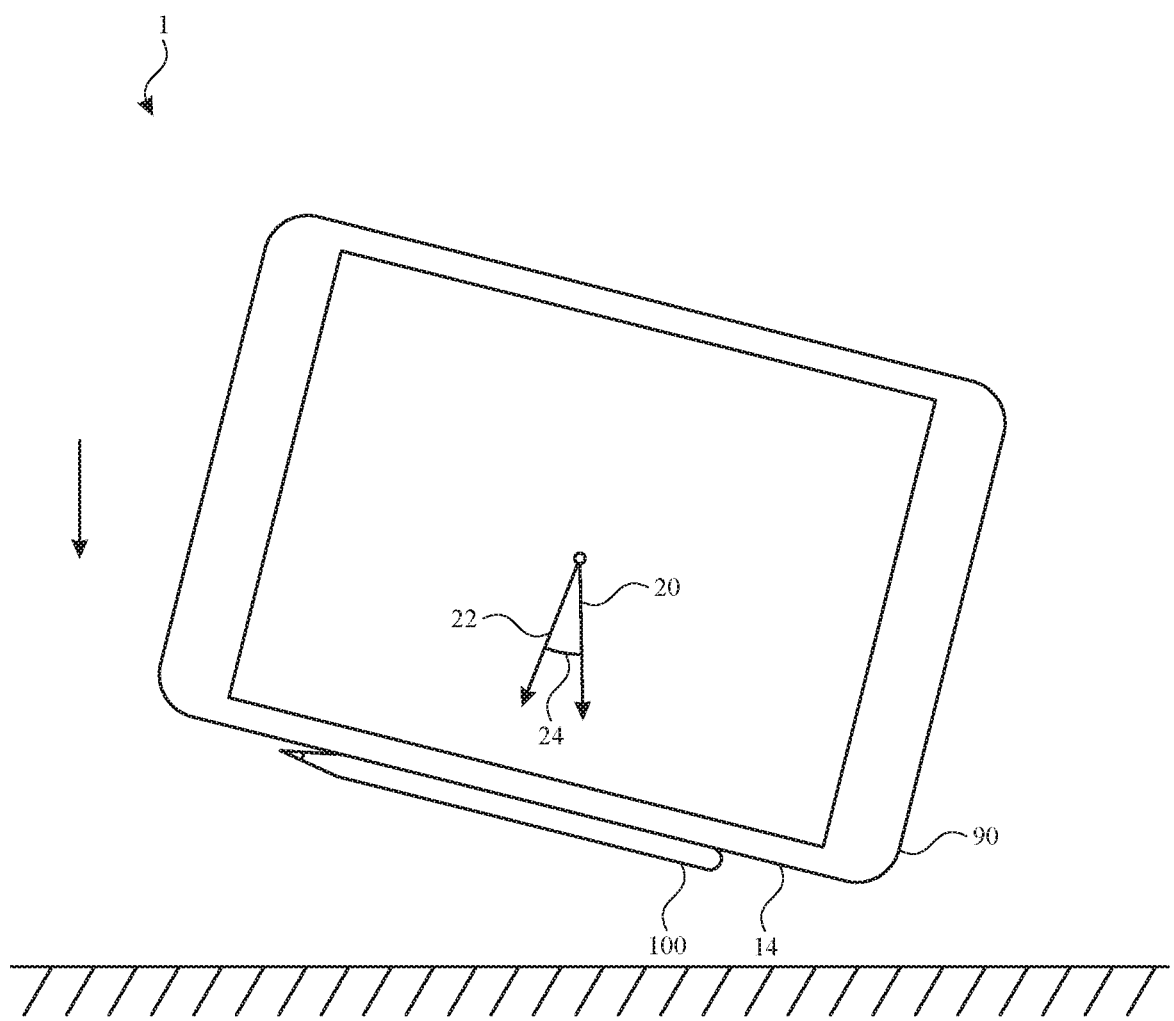
FIG. 4 illustrates a front view of a system including a stylus and a host device in free fall, according to some embodiments of the subject technology.

According to some embodiments, the system 1 of the present disclosure can detect, analyze, and respond to a drop event to reduce and/or prevent damage to the stylus 100 and/or the host device 90. As shown in FIG. 4, during drop motion, the host device 90 and the stylus 100 may fall in a manner that positions the stylus 100 between the host device 90 and the ground or another object that is gravitationally below the stylus 100 and the host device 90. In such an orientation, forces may be transmitted upon impact through the stylus 100 to the host device 90. Based on the shapes and/or types of engagements, the forces transmitted through the stylus 100 may cause greater damage to the host device 90 than would have occurred if the stylus 100 were absent. For example, the host device 90 may have reinforced corners or other structural features that mitigate damage upon direct impact to the host device 90. However, damage to areas near the stylus 100 may be more effectively mitigated by separating the stylus 100 from the host device 90 during a drop event. Accordingly, the detection of orientation can contribute to a determination that separation be achieved.

In other orientations, the host device 90 may receive forces by contacting a surface (e.g., the ground) directly and without receiving forces transmitted through the stylus 100. In such orientations, there may be no benefit achieved by separating the stylus 100 from the host device 90. Accordingly, the detection of orientation can contribute to a determination that separation not be achieved.

To determine orientation, components of the system 1 can determine an orientation of the host device 90, and orientation of the stylus 100, a direction of a gravitational force, a direction of drop motion, and/or relative differences between any of the above. For example, as shown in FIG. 4, the system 1 can determine, e.g., with an inertial measurement unit, a gravitationally downward direction 20. The system 1 can further determine, e.g., with an inertial measurement unit, a first orientation direction 22 of the host device 90 and/or the stylus 100. An angle 24 can be defined as a difference between the gravitationally downward direction 20 and the first orientation direction 22. Based on known shapes, sizes, and relative positions of the host device 90 and the stylus 100, the angle 24 can be used to determine whether or not an expected impact at a particular orientation will result in forces being transmitted through the stylus 100 to the host device 90. Appropriate actions can then be taken, as discussed further herein.

Figure 5:
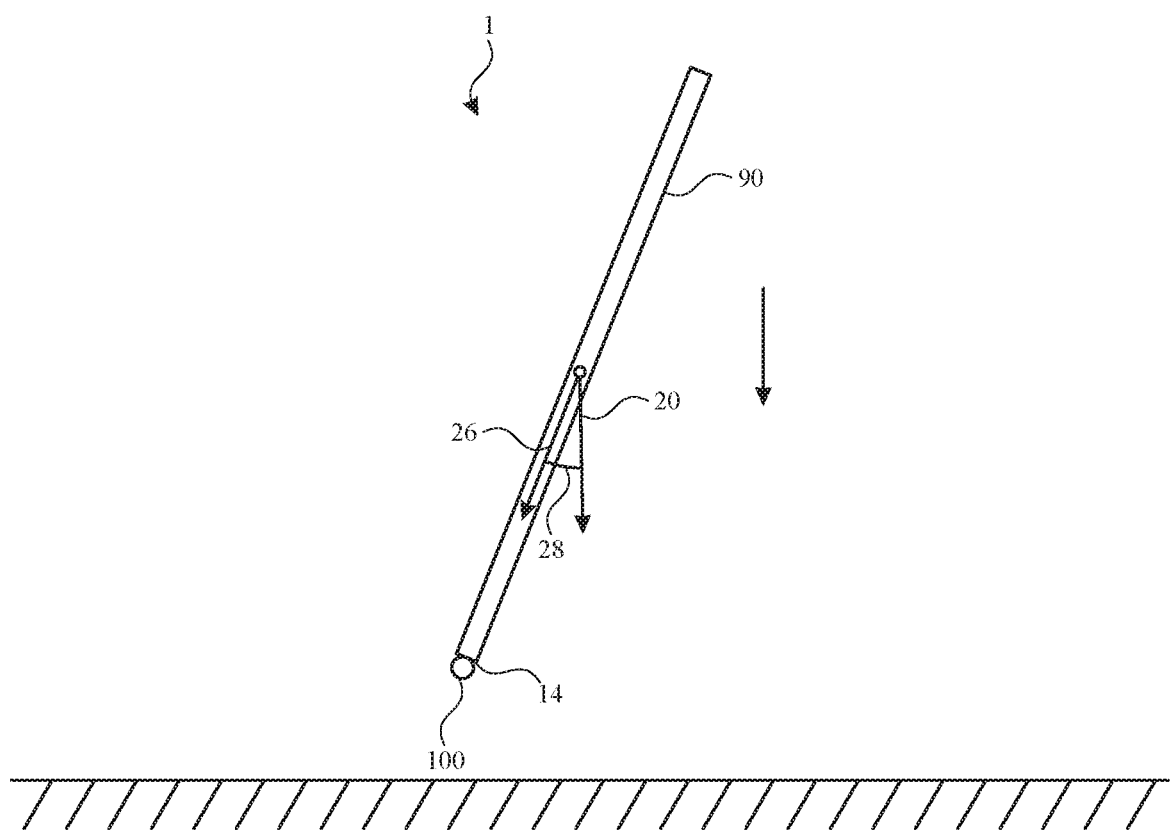
FIG. 5 illustrates a side view of a system including a stylus and a host device in free fall, according to some embodiments of the subject technology.

It will be understood that orientation can be detected in one or more of multiple dimensions. For example, as shown in FIG. 5, the system 1 can further determine, e.g., with an inertial measurement unit, a second orientation direction 26 of the host device 90 and/or the stylus 100. An angle 28 can be defined as a difference between the gravitationally downward direction 20 and the second orientation direction 26. Based on known shapes, sizes, and relative positions of the host device 90 and the stylus 100, the angle 28 can be used to determine whether or not an expected impact at a particular orientation will result in forces being transmitted through the stylus 100 to the host device 90. Appropriate actions can then be taken, as discussed further herein.

Figure 6:
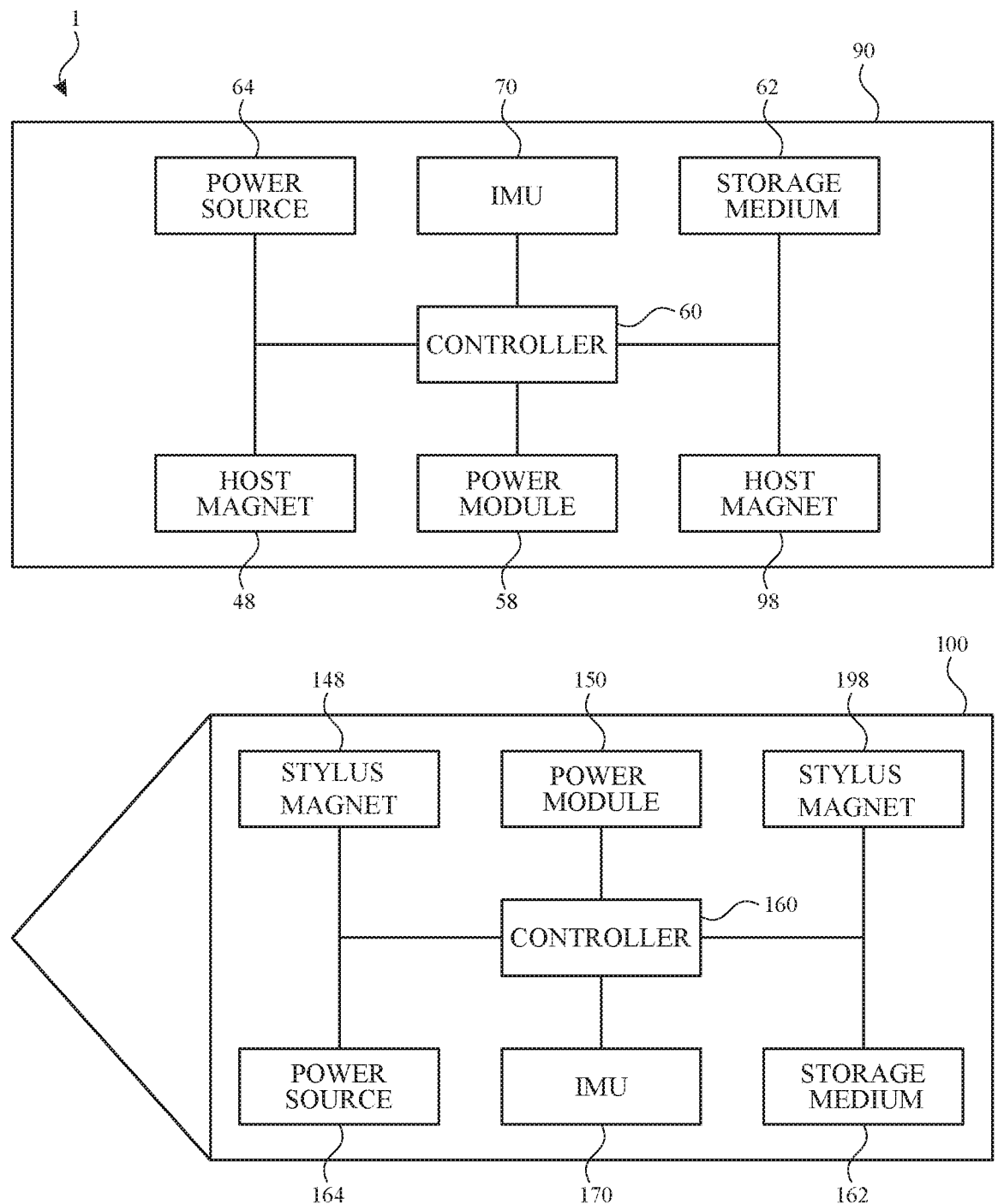
FIG. 6 illustrates a block diagram showing the stylus and the host device of FIG. 1, according to some embodiments of the subject technology.

The host device 90 and/or the stylus 100 can be provided with components that facilitate detection, analysis, and response to drop events. Examples of a host device 90 and a stylus 100 are shown in FIG. 6. While each is shown containing certain components, it will be recognized that components can be provided on one or both of the host device 90 and the stylus 100.

As shown in FIG. 6, the host device 90 can include a controller 60 and a non-transitory storage medium 62. The non-transitory storage medium 62 can include, for example, a magnetic storage medium, optical storage medium, magneto-optical storage medium, read-only memory, random access memory, erasable programmable memory, flash memory, or combinations thereof. According to some embodiments, the controller 60 can execute one or more instructions stored in the non-transitory storage medium 62 to perform one or more functions.

The host device 90 can include a power source 64, such as one or more batteries and/or power management units. The host device 90 can include components for charging the power source 64, such as a host power module 58, and/or for charging other devices, such as the stylus 100. The host power module 58 can include one or more components for receiving and/or transmitting power wirelessly (e.g., inductively), for example to the stylus 100.

The host device 90 can include a host inertial measurement unit ("IMU") 70 that provides information regarding a characteristic of the host device 90, such as inertial angles thereof. For example, the host IMU 70 can include a six-degrees of freedom IMU that calculates the host device's position, velocity, and/or acceleration based on six degrees of freedom (x, y, z, $\theta_x$, $\theta_y$, and $\theta_z$). The host IMU 70 can include one or more of an accelerometer, a gyroscope, and/or a magnetometer. Additionally or alternatively, the host device 90 can detect motion characteristics of the host device 90 with one or more other motion sensors, such as an accelerometer, a gyroscope, a global positioning sensor, a tilt sensor, and so on for detecting movement and acceleration of the host device 90. The host IMU 70 can provide data to the controller 60 for processing.

The host device 90 can include host magnets 48 and 98, as discussed herein. The host magnets 48 and 98 can be passive or actively controlled magnets (e.g., electromagnets). The host magnets can be part of or include a retention mechanism such as those discussed further herein. As discussed above, the host power module 58 and the host magnets 48 and 98 can be positioned so that, when the stylus magnets 148 and 198 are aligned with the host magnets 48 and 98, the stylus power module 150 is aligned with the stylus power module 150 of the host device 90.

As used herein, "magnet" can include a magnet of a hard magnetic material and/or a magnet of a soft magnetic material. Hard magnetic materials include materials that retain their magnetism even after the removal of an applied magnetic field. Magnets that include hard magnetic material can form permanent magnets. Hard magnetic materials include neodymium (NdFeB), ferrite, AlNiCo, iron-neodymium, iron-boron, cobalt-samarium, iron-chromium-cobalt, and combinations or alloys thereof. Soft magnetic materials include materials that are responsive to magnetic fields, but do not retain their magnetism after removal of an applied magnetic field. Magnets that include soft magnetic material can form temporary magnets. Soft magnetic materials include iron, iron-cobalt, iron-silicon (FeSi), steel, stainless steel, iron-aluminum-silicon, nickel-iron, ferrites, and combinations or alloys thereof. It will be recognized that "hard magnetic" and "soft magnetic" does not necessarily relate to the rigidity of the materials.

The host device 90 can include a communication component (not shown) for communicating with the host device 90 and/or another device. The communication component can be part of or include the host power module 58. For example, a signal can be encoded with power transmissions to and/or from the host power module 58. The communication component can include one or more wired or wireless components, WiFi components, near field communication components, Bluetooth components, and/or other communication components. The communication component can include one or more transmission elements, such as one or more antennas. Alternatively or in combination, the communication component can include an interface for a wired connection to the host device 90 and/or another device.

The host device 90 can also include components that facilitate operation with the stylus 100. For example, the host device 90 can include one or more sensors, one or more communication interfaces, one or more data connectors, one or more power connectors, one or more input/output devices, such as a speaker, a rotary input device, a microphone, an on/off button, a mute button, a biometric sensor, a camera, a force and/or touch sensitive trackpad, and so on.

As further shown in FIG. 6, the stylus 100 can include a controller 160 and a non-transitory storage medium 162. The non-transitory storage medium 162 can include, for example, a magnetic storage medium, optical storage medium, magneto-optical storage medium, read-only memory, random access memory, erasable programmable memory, flash memory, or combinations thereof. According to some embodiments, the controller 160 can execute one or more instructions stored in the non-transitory storage medium 162 to perform one or more functions.

The stylus 100 can include a power source 164, such as one or more batteries and/or power management units. The stylus 100 can include components for charging the power source 164, such as a stylus power module 150, from the host device 90. The stylus power module 150 can include one or more components for receiving and/or transmitting power wirelessly (e.g., inductively), for example from the host device 90.

The stylus 100 can include a stylus inertial measurement unit ("IMU") 170 that provides information regarding a characteristic of the stylus 100, such as inertial angles thereof. For example, the stylus IMU 170 can include a six-degrees of freedom IMU that calculates the stylus's position, velocity, and/or acceleration based on six degrees of freedom (x, y, z, $\theta_x$, $\theta_y$, and $\theta_z$). The stylus IMU 170 can include one or more of an accelerometer, a gyroscope, and/or a magnetometer. Additionally or alternatively, the stylus 100 can detect motion characteristics of the stylus 100 with one or more other motion sensors, such as an accelerometer, a gyroscope, a global positioning sensor, a tilt sensor, and so on for detecting movement and acceleration of the stylus 100. The stylus IMU 170 can provide data to the controller 160 for processing.

It will be understood that the host device 90 and/or the stylus 100 can share information, such that detections by one can be communicated to the other for use as described herein. It will be understood that where the host device 90 and/or the stylus 100 omits any component provided by the other, the function of such a component can be achieved by sharing information.

The stylus 100 can include stylus magnets 148 and 198, as discussed herein. The stylus magnets 148 and 198 can be passive or actively controlled magnets (e.g., electromagnets). The stylus magnets can be part of or include a retention mechanism such as those discussed further herein. As discussed above, the stylus power module 150 and the stylus magnets 148 and 198 can be positioned so that, when the stylus magnets 148 and 198 are aligned with the host magnets 48 and 98, the stylus power module 150 is aligned with the host power module 58 of the host device 90.

The stylus 100 can include a communication component (not shown) for communicating with the host device 90 and/or another device. The communication component can be part of or include the stylus power module 150. For example, a signal can be encoded with power transmissions to and/or from the stylus power module 150. The communication component can include one or more wired or wireless components, WiFi components, near field communication components, Bluetooth components, and/or other communication components. The communication component can include one or more transmission elements, such as one or more antennas. Alternatively or in combination, the communication component can include an interface for a wired connection to the host device 90 and/or another device.

The stylus 100 can include other components including, but not limited to, displays, sensors, switches (e.g., dome switches), buttons, voice coils, and/or other components. The stylus 100 can detect environmental conditions and/or other aspects of the operating environment of the stylus 100 with an environmental sensor such as an ambient light sensor, proximity sensor, temperature sensor, barometric pressure sensor, moisture sensor, and the like. The stylus 100 can include a haptic feedback component that provides haptic feedback with tactile sensations to the user. The haptic feedback component can be implemented as any suitable device configured to provide force feedback, vibratory feedback, tactile sensations, and the like. For example, in one embodiment, the haptic feedback component may be implemented as a linear actuator configured to provide a punctuated haptic feedback, such as a tap or a knock. The stylus 100 can detect biological characteristics of the user manipulating the stylus with a biosensor that detects skin temperature, heart rate, respiration rate, blood oxygenation level, blood volume estimates, blood pressure, or a combination thereof. The stylus 100 can quantify or estimate a property of an object nearby or otherwise external to the stylus 100 with a utility sensor such as magnetic field sensors, electric field sensors, color meters, acoustic impedance sensors, pH level sensor, material detection sensor, and so on. Such data may be used to adjust or update the operation of the stylus 100 and/or may communicate such data to the host device 90 to adjust or update the operation thereof.

Figure 7:
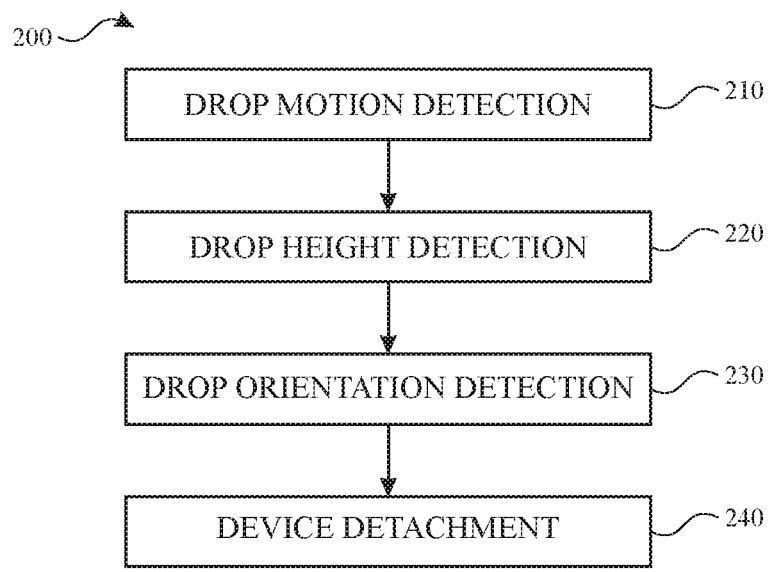
FIG. 7 illustrates a flow chart of operations, according to some embodiments of the subject technology.

During use, the host device and/or the stylus can be coupled together and controllably be separated based on detection and analysis of a drop event. An example of a process 200 is illustrated in FIG. 7. It will be understood that the process 200 can include additional operations, fewer operations, or operations in a different order. One or more of the operations can be performed by the host device and/or one or more of the operations can be performed by the stylus. The host device and the stylus can be in communication with each other to coordinate operations, including detections, analyses, and responses.

In operation 210, the host device and/or the stylus detects motion that is indicative of a drop event. For example, an IMU of the host device and/or the stylus can be operated to determine that the acceleration and/or velocity of the system is consistent with free fall. Such a condition can be determined, for example, by an accelerometer that distinguishes between a rest state (e.g., 1 g force) and a free fall state (e.g., 0 g force). Forces can be detected in multiple axes and combined to determine a total acceleration of the system. Upon detecting a drop event, the host device and/or the stylus can proceed to additional analysis and/or device detachment.

In operation 220, the host device and/or the stylus detects a drop height, for example based on data generated by an IMU. The drop height can be determined based on a duration of time spent in free fall. For example, the height can be calculated as:

$$h = \tfrac{1}{2}gt^2,$$

where h is the height, g is the gravity constant, and t is the time spent in free fall. As the time increases, the height calculate can be updated and compared to a height threshold value. For example, a height threshold value for the height can be predetermined based on the minimum drop height for which subsequent action is desired. Upon reaching the height threshold value for the height, the host device and/or the stylus can proceed to additional analysis and/or device detachment.

In operation 230, the orientation of the host device and/or the stylus is detected, for example based on data generated by an IMU. For example, an IMU of the host device and/or the stylus can be operated to determine an angle between a direction of the host device and/or the stylus and a gravitationally downward direction (see also FIGS. 4 and 5). The angle can indicate whether the stylus is positioned between the host device and a surface (e.g., the ground). For example, angles within an angular threshold value can indicate that the stylus is positioned between the host device and that detachment may be desired prior to impact. By further example, angles exceeding an angular threshold value can indicate that the stylus is not positioned between the host device and that detachment is not desired or necessary. Such angles can be detected in multiple dimensions. Upon detecting that the angle is within the angular threshold value for the orientation, the host device and/or the stylus can proceed to additional analysis and/or device detachment.

In operation 240, the host device and/or the stylus performs an action to detach the stylus from the host device. Detachment can be initiated by either the host device, the stylus, and/or another device. Detachment can be achieved prior to impact with a surface (e.g., the ground). Various examples of mechanisms for achieving detachment are discussed herein. It will be understood that any one or more of these mechanisms can be employed based on detections and analysis discussed above. Further, while the mechanisms below are shown on the host device and acting with respect to the stylus, it will be recognized that each of the mechanisms can be inverted and positioned on the stylus to act with respect to the host device.

Figure 8:
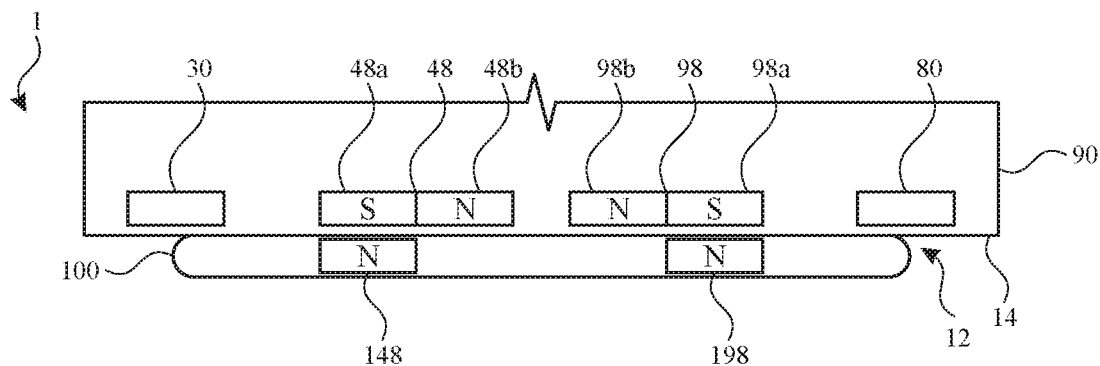
FIG. 8 illustrates a schematic view of a stylus and a host device in a coupled configuration, according to some embodiments of the subject technology.
Figure 9:
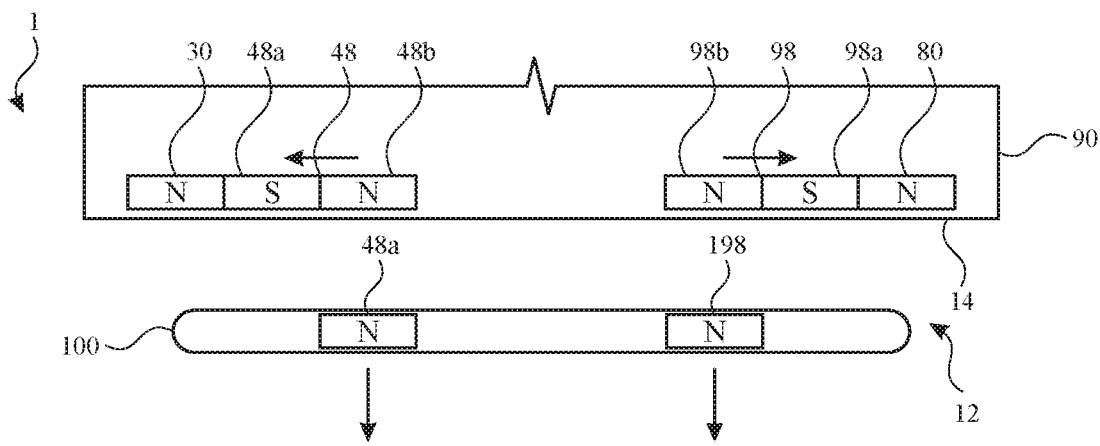
FIG. 9 illustrates a schematic view of the stylus and host device of FIG. 8 in a released configuration, according to some embodiments of the subject technology.

FIGS. 8 and 9 illustrate an example of a system for magnetically retaining a stylus against a host device and magnetically detaching the stylus upon movement of certain magnets. As shown in FIG. 8, the system 1 can include a host device 90 and a stylus 100 that together form a coupling system 12 for controllably coupling the stylus 100 to the host device 90. The coupling system 12 includes magnets on the host device 90 and/or the stylus 100 and a mechanism for altering the interaction between the magnets. For example, a host device 90 can include host magnets 48 and 98 for magnetically coupling with stylus magnets 148 and 198 to retain the stylus 100 against the engagement portion 14 of the host device 90. For example, the host magnets 48 and 98 can include first magnetic poles 48a and 98a to attract the stylus magnets 148 and 198, respectively. In first positions of the host magnets 48 and 98, the first magnetic poles 48a and 98a are positioned opposite the stylus magnets 148 and 198 and have a polarity that is opposite the polarity of the corresponding stylus magnets 148 and 198. With the host magnets 48 and 98 in the first positions, the stylus 100 can be magnetically coupled to the host device 90 by the magnetic attraction. Where the host magnets 48 and 98 are permanent magnets, no additional energy would be required to maintain the magnetic attraction.

The host device 90 can further include shifters 30 and 80 for moving the host magnets 48 and 98 from the first positions to second positions. As shown in FIG. 9, the shifters 30 and 80 can be operated to move the host magnets 48 and 98 along the engagement portion 14 of the host device 90. In second positions of the host magnets 48 and 98, the first magnetic poles 48b and 98b are positioned opposite the stylus magnets 148 and 198 and have a polarity that is the same as the polarity of the corresponding stylus magnets 148 and 198. With the host magnets 48 and 98 in the second positions, the stylus 100 can be magnetically detached from the host device 90 by the magnetic repulsion. The shifters 30 and 80 can be electromagnets to magnetically attract and/or repel the host magnets 48 and 98. Additionally or alternatively, the shifters 30 and 80 can mechanically move the host magnets 48 and 98 by direct contact. Following detachment of the stylus, the host magnets 48 and 98 can be returned to the first positions by the shifters 30 and 80 and/or another (e.g., biasing) mechanism in preparation for magnetically coupling with the stylus thereafter.

Figure 10:
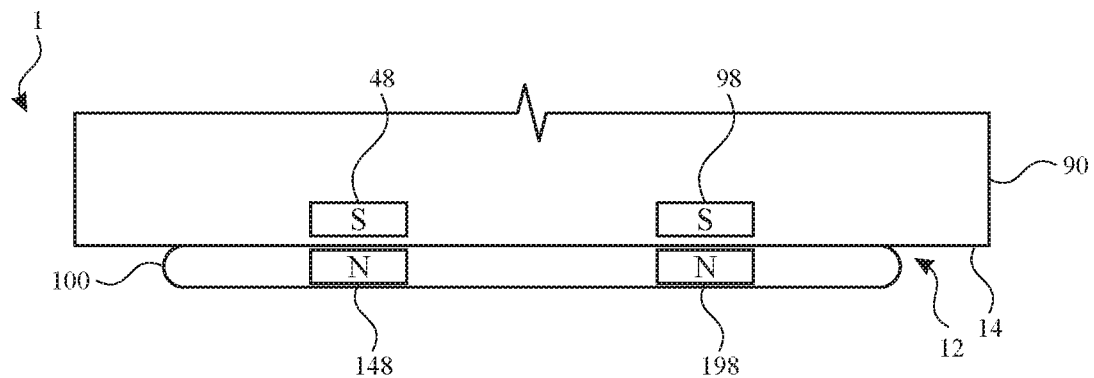
FIG. 10 illustrates a schematic view of a stylus and a host device in a coupled configuration, according to some embodiments of the subject technology.
Figure 11:
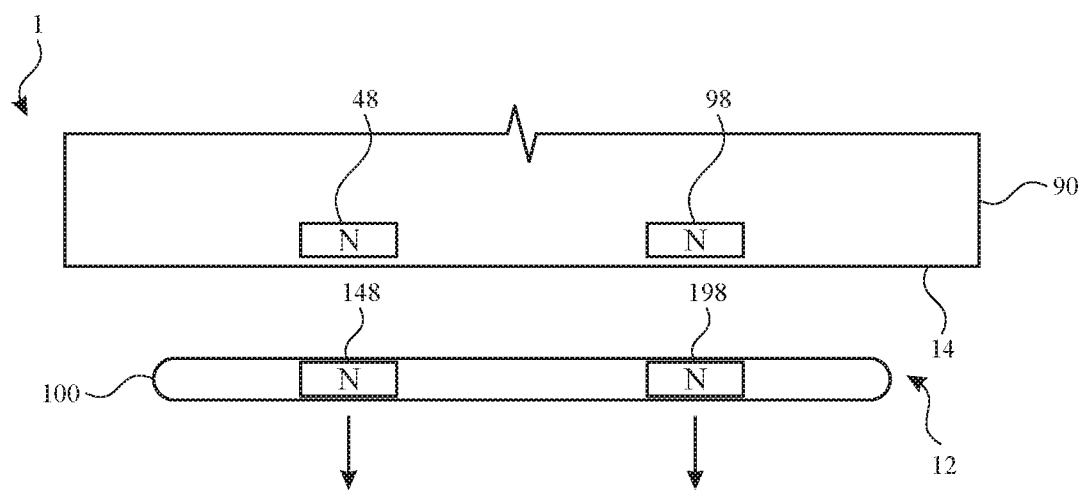
FIG. 11 illustrates a schematic view of the stylus and the host device of FIG. 10 in a released configuration, according to some embodiments of the subject technology.

FIGS. 10 and 11 illustrate an example of a system for magnetically retaining a stylus against a host device and magnetically detaching the stylus upon deactivation of certain magnets. As shown in FIG. 10, the system 1 can include a host device 90 and a stylus 100 that together form a coupling system 12 for controllably coupling the stylus 100 to the host device 90. The coupling system 12 includes magnets on the host device 90 and/or the stylus 100. For example, a host device 90 can include host magnets 48 and 98 for magnetically coupling with stylus magnets 148 and 198 to retain the stylus 100 against the engagement portion 14 of the host device 90. The host magnets 48 and 98 can be, for example, electromagnets that generate a magnetic field for attracting the stylus magnets 148 and 198. With the host magnets 48 and 98 active, the stylus 100 can be magnetically coupled to the host device 90 by the magnetic attraction.

The host magnets 48 and 98 of the host device 90 can be operated to magnetically repel the stylus magnets 148 and 198. As shown in FIG. 11, the polarity of the host magnets 48 and 98 can be altered (e.g., reversed) to repel the stylus magnets 148 and 198. With the host magnets 48 and 98 and the stylus magnets 148 and 198 in a repulsive magnetic arrangement, the stylus 100 can be magnetically detached from the host device 90 by the magnetic repulsion. Following detachment of the stylus, the host magnets 48 and 98 can be deactivated or returned to the original magnetic orientation for magnetically coupling with the stylus thereafter.

Figure 12:
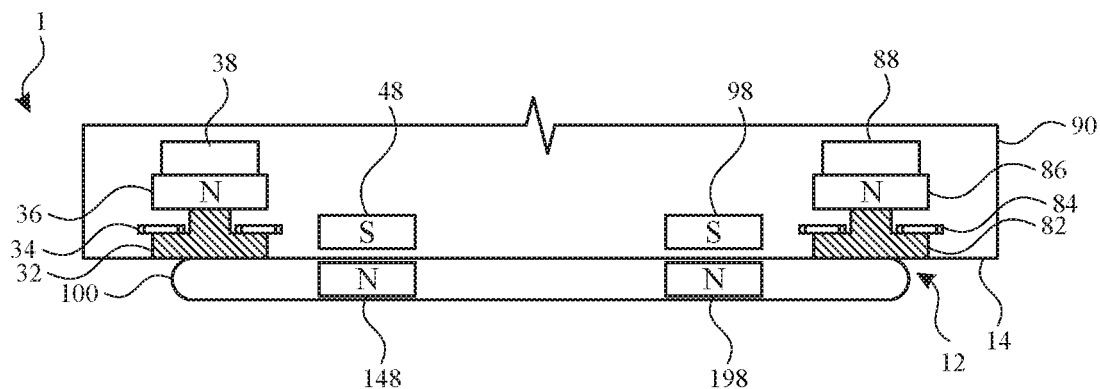
FIG. 12 illustrates a schematic view of a stylus and a host device in a coupled configuration, according to some embodiments of the subject technology.
Figure 13:
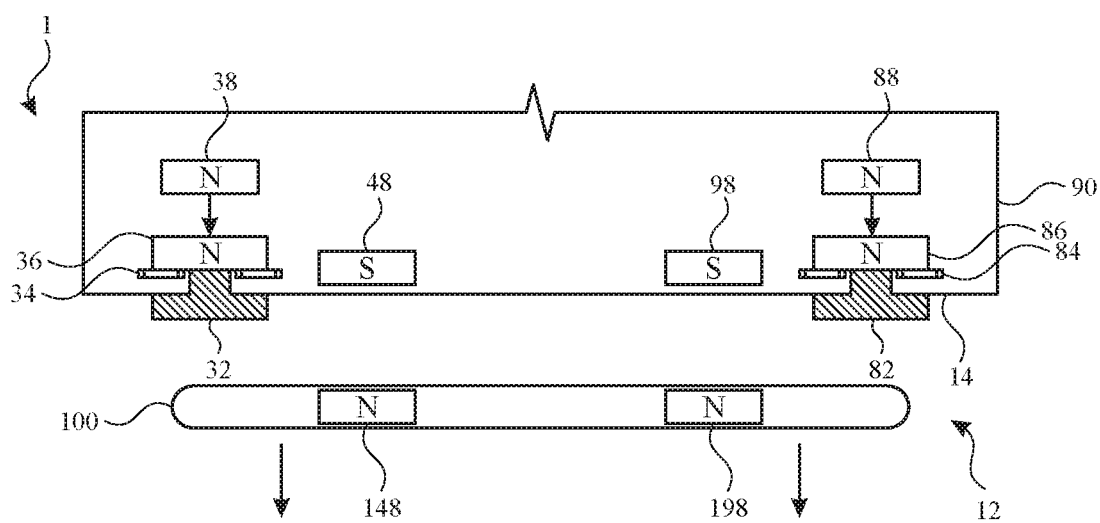
FIG. 13 illustrates a schematic view of the stylus and the host device of FIG. 12 in a released configuration, according to some embodiments of the subject technology.

FIGS. 12 and 13 illustrate an example of a system for magnetically retaining a stylus against a host device and mechanically detaching the stylus upon movement of actuators. As shown in FIG. 12, the system 1 can include a host device 90 and a stylus 100 that together form a coupling system 12 for controllably coupling the stylus 100 to the host device 90. The coupling system 12 includes magnets on the host device 90 and/or the stylus 100 and a mechanism for overcoming the coupling connection. For example, a host device 90 can include host magnets 48 and 98 for magnetically coupling with stylus magnets 148 and 198 to retain the stylus 100 against the engagement portion 14 of the host device 90. For example, the host magnets 48 and 98 can have magnetic orientations to attract the stylus magnets 148 and 198, respectively. Where the host magnets 48 and 98 are permanent magnets, no additional energy would be required to maintain the magnetic attraction. Portions of the stylus 100 can abut actuators 32 and 82, which can be flush with the engagement portion 14 of the host device 90 while in first (e.g., retracted) positions. The actuators 32 and 82 can be biased and/or otherwise held in the first positions by a magnetic coupling between actuator magnets 36 and 86 and control magnets 38 and 88, respectively. While in the first positions, the actuators 32 and 82 can rest on stoppers 34 and 84 of the host device 90. The control magnets 38 and 88 can be, for example, electromagnets that generate a magnetic field for attracting and/or repelling the actuator magnets 36 and 86.

The actuators 32 and 82 of the host device 90 can move to detach the stylus 100 from the host device 90. As shown in FIG. 13, the actuators 32 and 82 can be operated to move to second positions that are proud of the engagement portion 14 of the host device 90. Moving to the second positions, the actuators 32 and 82 apply forces to the stylus 100 that overcome the force of magnetic coupling between the host magnets 48 and 98 and the stylus magnets 148 and 198. The actuators 32 and 82 can be advanced by operating the control magnets 38 and 88 to produce a magnetic field that repels the actuator magnets 36 and 86. Other mechanisms for advancing and/or retracting the actuators 32 and 82 are contemplated, such as motors, hydraulic actuators, etc. While in the second positions, the actuator magnets 36 and 86 can rest on stoppers 34 and 84 of the host device 90. Following detachment of the stylus, the control magnets 38 and 88 can be deactivated or the actuators 32 and 82 returned to the first positions by the control magnets 38 and 88 and/or another (e.g., biasing) mechanism in preparation for magnetically coupling with the stylus thereafter.

Figure 14:
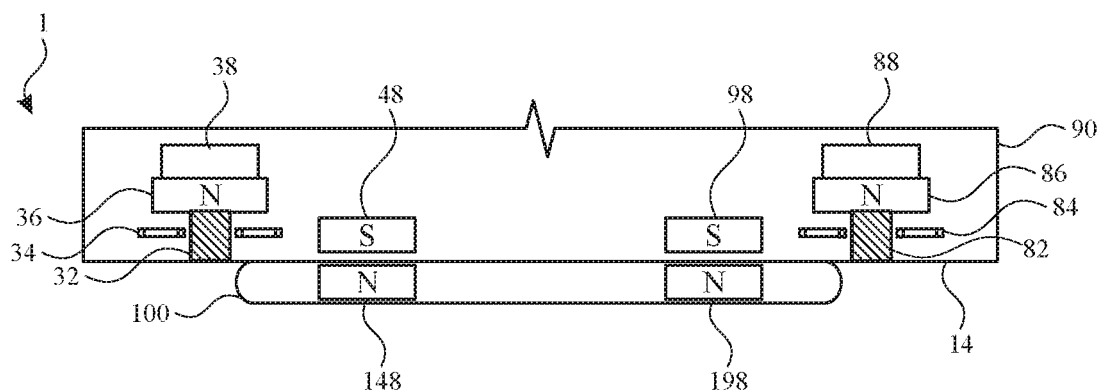
FIG. 14 illustrates a schematic view of a stylus and a host device in a coupled configuration, according to some embodiments of the subject technology.
Figure 15:
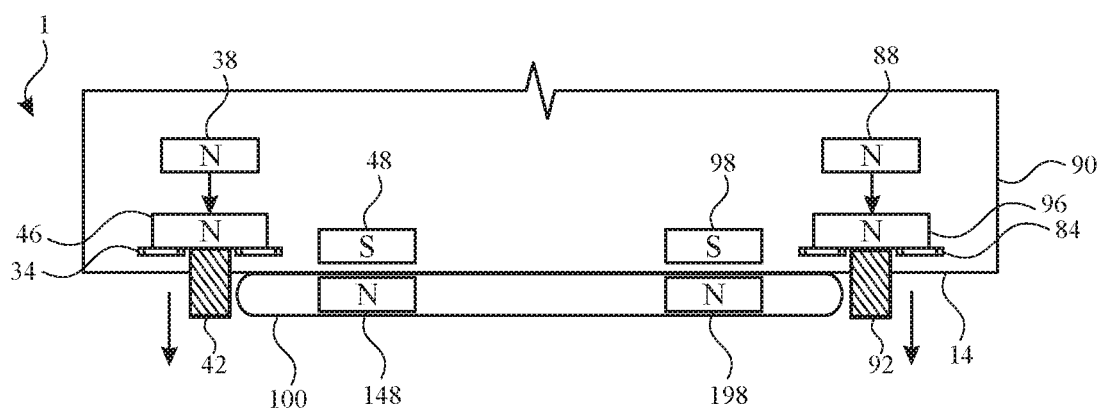
FIG. 15 illustrates a schematic view of the stylus and the host device of FIG. 14 with shock absorbers being actuated, according to some embodiments of the subject technology.

FIGS. 14 and 15 illustrate an example of a system for absorbing shock of an impact. As shown in FIG. 14, a host device 90 can include host magnets 48 and 98 for magnetically coupling with stylus magnets 148 and 198 to retain the stylus 100 against the engagement portion 14 of the host device 90. For example, the host magnets 48 and 98 can have magnetic orientations to attract the stylus magnets 148 and 198, respectively. Where the host magnets 48 and 98 are permanent magnets, no additional energy would be required to maintain the magnetic attraction. Shock absorbers 42 and 92 can be flush with the engagement portion 14 of the host device 90 while in first (e.g., retracted) positions. The shock absorbers 42 and 92 can be biased and/or otherwise held in the first positions by a magnetic coupling between absorber magnets 46 and 96 and control magnets 38 and 88, respectively. The control magnets 38 and 88 can be, for example, electromagnets that generate a magnetic field for attracting and/or repelling the absorber magnets 46 and 96.

The shock absorbers 42 and 92 of the host device 90 can move to protect the stylus 100 from impact during a drop event. As shown in FIG. 15, the shock absorbers 42 and 92 can be operated to move to second positions that are proud of the engagement portion 14 of the host device 90. Moving to the second positions, the shock absorbers 42 and 92 can extend beyond the stylus 100 and provide points of contact upon impact with a surface (e.g., the ground). The shock absorbers 42 and 92 can be advanced by operating the control magnets 38 and 88 to produce a magnetic field that repels the absorber magnets 46 and 96. Other mechanisms for advancing and/or retracting the shock absorbers 42 and 92 are contemplated, such as motors, hydraulic actuators, etc. While in the second positions, the absorber magnets 46 and 96 can rest on stoppers 34 and 84 of the host device 90. Impact with the shock absorbers 42 and 92 can allow forces to be absorbed therein thereby reducing or eliminating damage to the stylus 100 and other components of the host device 90. Following impact and upon or after conclusion of a drop event, the control magnets 38 and 88 can be deactivated or the shock absorbers 42 and 92 returned to the first positions by the control magnets 38 and 88 and/or another (e.g., biasing) mechanism.

While mechanisms for detachment or shock absorption are illustrated on the host device, it will be understood that such mechanisms can be implemented on the stylus. It will be further understood that such mechanisms can be implemented on a separate device, such as an interposer between the host device and the stylus. Such an interposer can form a case around one of the host device and the stylus.

Accordingly, in accordance with embodiments disclosed herein, components of a stylus and a host device are provided in a manner that mitigates and/or avoids damage to the stylus and/or the host device. Such components can cause the stylus and the host device to separate when drop motion is detected. Such separation can reduce and/or prevent damage that would have otherwise occurred if the stylus and the electronic device remained coupled together during impact. Such components can additionally or alternatively absorb forces upon impact to protect the stylus and the host device. It will be understood that variations in the illustrated examples can be provided to achieve similar results.

While some embodiments of touch-based input devices disclosed herein relate to styluses, it will be appreciated that the subject technology can encompass and be applied to other input devices. For example, an input device in accordance with embodiments disclosed herein can include a phone, a tablet computing device, a mobile computing device, a watch, a laptop computing device, a mouse, a game controller, a remote control, a digital media player, and/or any other electronic device. Further, the host device can be any device that interacts with a touch-based input device. For example, a host device in accordance with embodiments disclosed herein can include a tablet, a phone, a laptop computing device, a desktop computing device, a wearable device, a mobile computing device, a tablet computing device, a display, a television, a phone, a digital media player, and/or any other electronic device.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A system comprising:
   a stylus having a stylus magnet; and
   a host device comprising:
      an inertial measurement unit for detecting an acceleration and an orientation of the host device;
      a host magnet; and
      a coupling system configured to controllably couple the stylus magnet to the host magnet, wherein the coupling system is configured to release the stylus from the host device based on the acceleration and the orientation by moving the host magnet from a first position, in which the host magnet magnetically attracts the stylus magnet, to a second position, in which the host magnet magnetically repels the stylus magnet.

2. The system of claim 1, wherein the host device is configured to detect a drop event based on data measured by the inertial measurement unit.

3. The system of claim 2, wherein the host device is configured to calculate a height traveled during the drop event based on the data measured by the inertial measurement unit.

4. The system of claim 3, wherein the host device is configured to determine the orientation of the host device during the drop event based on the data measured by the inertial measurement unit.

5. The system of claim 4, wherein the host device is configured to release the stylus from the host device when the drop event is detected, the height exceeds a height threshold, and the orientation is within an angular threshold with respect to a gravitationally downward direction.

6. The system of claim 1, wherein:
   the stylus comprises a stylus power module;
   the host device comprises a host power module; and
   when the stylus magnet is aligned with the host magnet, the stylus power module is aligned with the host power module.

7. A host device comprising:
a host magnet configured to retain a stylus against the host device by magnetically attracting a stylus magnet of the stylus while the host magnet is in a first position;
an actuator configured to move the host magnet from the first position to a second position in which the host magnet magnetically repels the stylus magnet; and
an inertial measurement unit for detecting an acceleration and an orientation of the host device, wherein the actuator is configured to release the stylus from the host device based on the acceleration and the orientation.

8. The host device of claim 7, wherein the host magnet comprises:
a first magnetic pole that is aligned with the stylus magnet while the host magnet is in the first position; and
a second magnetic pole that is aligned with the stylus magnet while the host magnet is in the second position.

9. The host device of claim 7, wherein the actuator comprises an electromagnet configured to attract the host magnet to move the host magnet from the first position to the second position.

10. The host device of claim 7, wherein the actuator is configured to move the host magnet along an engagement portion of the host device and to which the stylus is coupled.

11. The host device of claim 7, wherein the host magnet is biased to the first position.

12. The host device of claim 7, wherein:
the host magnet is a first host magnet;
the stylus magnet is a first stylus magnet;
the actuator is a first actuator; and
the host device further comprises:
    a second host magnet configured to retain the stylus against the host device by magnetically attracting a second stylus magnet of the stylus; and
    a second actuator configured to move the second host magnet so that the second host magnet magnetically repels the second stylus magnet.

13. The host device of claim 7, wherein:
the stylus comprises a stylus power module;
the host device comprises a host power module; and
when the stylus magnet is aligned with the host magnet in the first position, the stylus power module is aligned with the host power module.

14. A host device comprising:
an inertial measurement unit for detecting an acceleration and an orientation of the host device;
a host magnet configured to move between a first position and a second position, wherein while the host magnet is in the first position the host magnet magnetically attracts a stylus magnet of a stylus to retain the stylus against the host device; and
an actuator comprising an electromagnet configured to, based on the acceleration and the orientation, move the host magnet by magnetic attraction with the electromagnet from the first position to the second position, wherein while the host magnet is in the second position the host magnet magnetically repels the stylus magnet, the actuator being further configured to, following detachment of the stylus from the host device, move the host magnet by magnetic repulsion with the electromagnet from the second position to the first position.

15. The host device of claim 14, wherein the host magnet comprises:
a first magnetic pole that is aligned with the stylus magnet while the host magnet is in the first position; and
a second magnetic pole that is aligned with the stylus magnet while the host magnet is in the second position.

16. The host device of claim 14, wherein the actuator is configured to move the host magnet along an engagement portion of the host device and to which the stylus is coupled.

17. The host device of claim 14, wherein the host magnet is biased to the first position.

18. The host device of claim 14, wherein:
the stylus comprises a stylus power module;
the host device comprises a host power module; and
when the stylus magnet is aligned with the host magnet in the first position, the stylus power module is aligned with the host power module.

* * * * *